Sept. 13, 1927.
E. E. FERGUSON
PORTABLE POWER CUT-OFF SAW
Filed Jan. 25, 1926
1,642,145
2 Sheets-Sheet 1
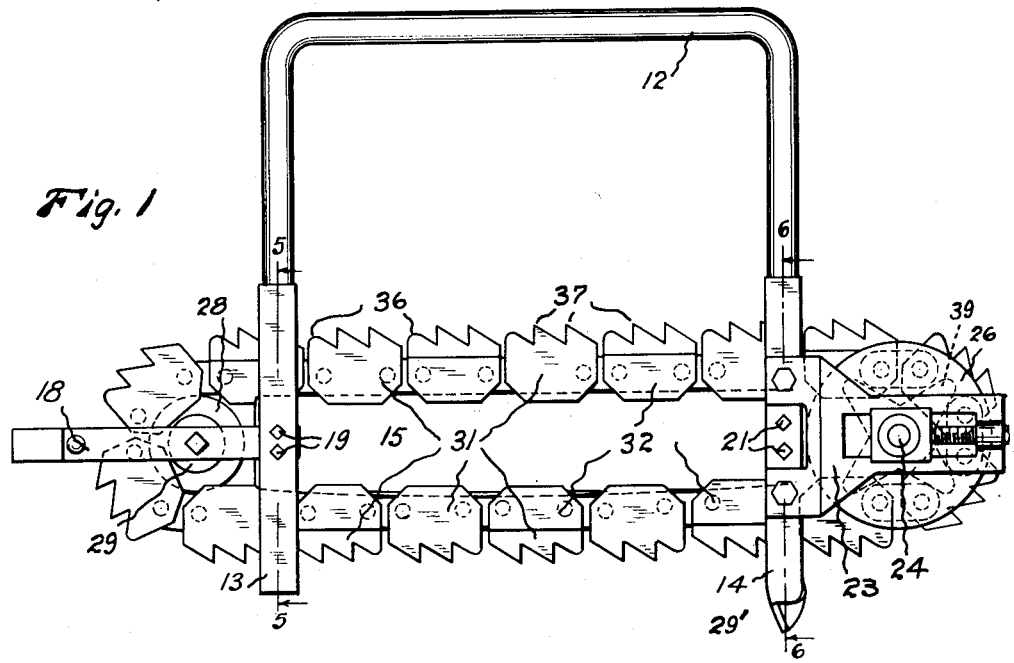
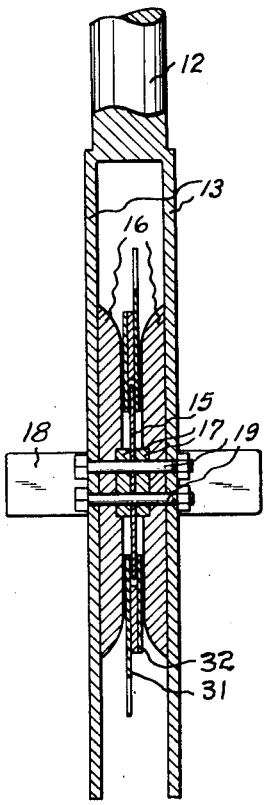
Fig. 5
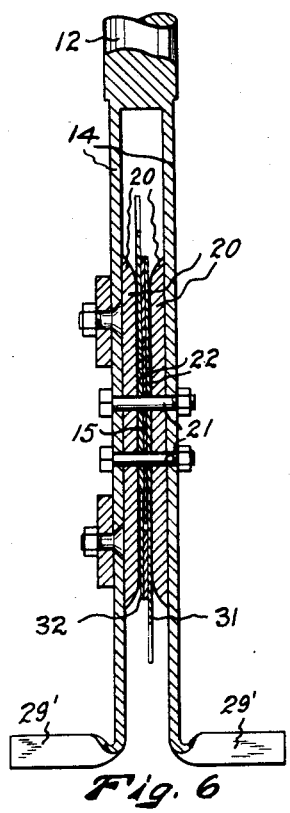
Fig. 6
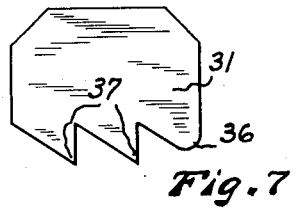
Fig. 7
Fig. 8
Fig. 9
Fig. 10
INVENTOR
Ernest E. Ferguson
BY
Fred C. Matheny
ATTORNEY Sept. 13, 1927.
E. E. FERGUSON
PORTABLE POWER CUT-OFF SAW
Filed Jan. 25, 1926
1,642,145
2 Sheets-Sheet 2
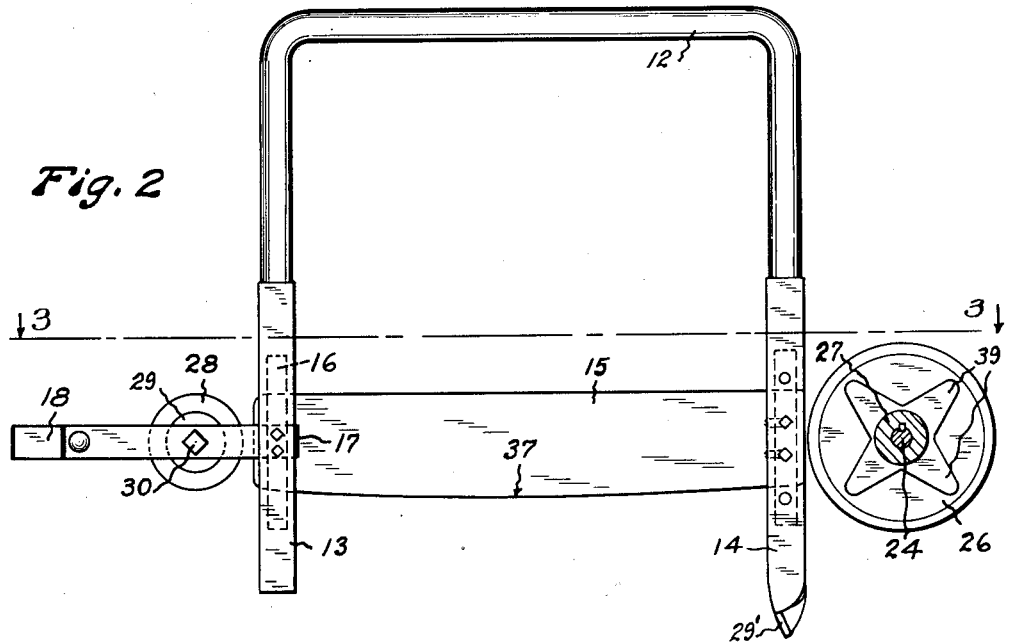
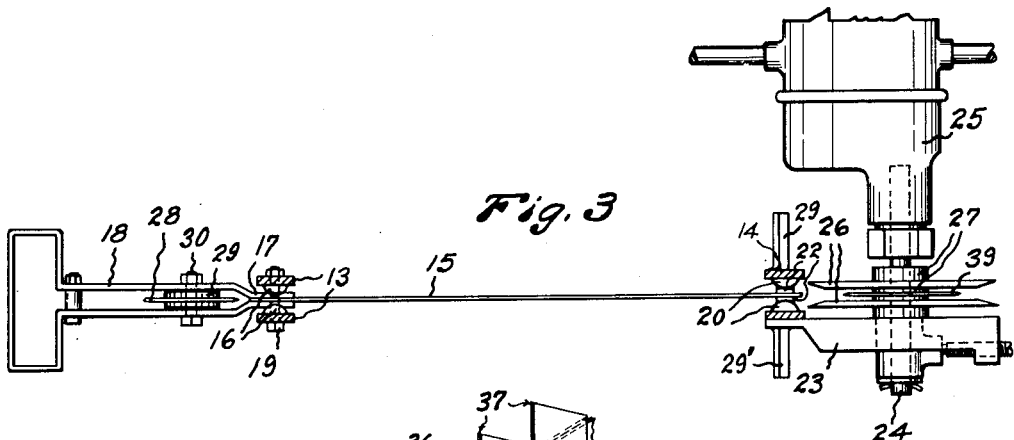
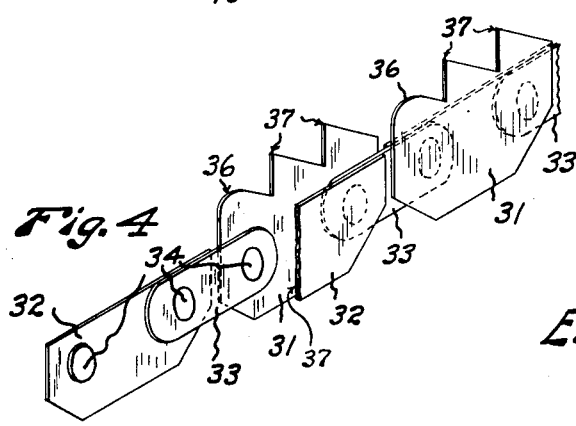
INVENTOR
Ernest E. Ferguson
BY
Fred C. Matheny
ATTORNEY Patented Sept. 13, 1927.

1,642,145

UNITED STATES PATENT OFFICE.

ERNEST E. FERGUSON, OF SEATTLE, WASHINGTON.

PORTABLE POWER CUT-OFF SAW.

Application filed January 25, 1926. Serial No. 83,521.

My invention relates to improvements in power operated portable saws of the form commonly termed chain saws and more particularly to improvements in the blades for said saws and the object of my invention is to provide a portable power operated saw that is strong and simple in construction, efficient in operation, not expensive to manufacture and that is light enough so that it may be carried and operated by one man.

A further object is to provide a portable power operated saw having a saw blade in the form of an endless flexible link belt of very thin and strong construction, free from pins and rivets on its outer side and arranged to run upon suitable rollers and driving means, said flexible saw blade being of a new and novel form of construction which makes it possible for me to reduce the weight of a saw of this type so that it is easily handled, operated and carried by one man.

In portable power saws of this nature it is very desirable that the saw be as light in weight as possible and that the end thrust or pull of the saw be as little as possible when the saw is in operation. To accomplish this it is obviously necessary to reduce the width of the blade, which is formed of a plurality of links, to a minimum so that a narrow, instead of a wide saw cut may be made, thus lessening the pull required to operate the saw and making it possible to use a lighter power unit and lighter weight construction of all parts. I am able to accomplish this by doing away with all rivets and pins in the saw blade and employing an electrically welded construction which affords a maximum strength in proportion to its thickness and leaves the outer sides of the saw blade parts free from all possible obstructions.

Other and more specific objects will be apparent from the following description taken in connection with the accompanying drawings.

In the drawings Figure 1 is a view in side elevation of a power operated portable saw constructed in accordance with my invention.

Fig. 2 is a view in side elevation of the frame with the flexible saw member removed, certain parts being broken away to reveal the construction of the driving means for the flexible saw member.

Fig. 3 is a view partly in plan and partly in section substantially on broken line 3—3 of Fig. 2.

Fig. 4 is a detail in perspective on a larger scale showing the construction of the saw blade mechanism.

Figs. 5 and 6 are sectional views on a larger scale on broken lines 5—5 and 6—6 respectively, of Fig. 1.

Figs. 7, 8, 9 and 10 are detached views in side elevation respectively of parts of the saw blade mechanism.

Like reference numerals designate like parts throughout the several views.

The saw frame is composed of a main frame piece or arch 12 of substantially U shape. The two ends of the main frame are forked or bifurcated as shown at 13 in Fig. 5, and 14 in Fig. 6 respectively to afford a passageway arranged in the plane of the frame through which the saw blade member is arranged to operate and said two ends 13 and 14 are connected by a relatively thin track member or saw blade guide 15 whereon the flexible saw blade is adapted to run. The bottom ends of the two frame members 14 are twisted and bent outwardly at right angles to form stops 29' against which the work may abut when the saw is in use.

Two guide members 16 are secured to the inner sides of the forked portion 13 of the frame lengthwise of said fork portion and in spaced apart relation so that the flexible saw blade may be guided therebetween. The guide members 16 are of substantially semi-circular cross section as shown in Fig. 3 and said guide members 16 are notched for the reception of the ends 17 of a handle member 18, see Fig. 5, the ends 17, guides 16, track member 15 and frame pieces 13, all being rigidly secured together by bolts 19.

The ends 14 at the other end of the saw frame have spaced apart guide members 20 of semi-circular cross section secured therebetween by bolts 21, the track member also being secured on the bolts 21 and spacing plates 22 being provided on each side of the track member 15 between said track member and the adjacent guide members 20.

An adjustable take up 23 which may be of standard construction is secured to one of the frame parts 14 and serves to support a shaft 24 that is connected with a portable motor 25 whereby said shaft may be driven. A saw driving member is mounted on the shaft 24 in alignment with the track member 15, said saw driving member comprising a spur wheel 39 supported between two spaced apart discs 26 that are all rigid with suitable hub and spacing members 27.

A relatively thin roller 28 having a rigidly connected hub 29 is mounted on a bearing 30 between the spaced apart sides of the handle member 18.

The cutting element or blade of the saw is in the form of an endless link belt made up of cutting sections 31, side sections 32, link members 33 and pivot discs 34. Each link of said belt is made up of a cutting section 31 and one side section 32, connected at both ends respectively with links 33 that are disposed between the cutting section 31 and side section 32. The links 33 have holes 35 in each end adapted to receive one of the pivot discs 34. In making up the saw belt one of the discs 34 is placed in each of the holes 35 in links 33, said links are properly positioned between the cutting section 31 and and side section 32 and the discs 34 are then electrically welded to the cutting sections 31 and side section 32, thus making a construction that is entirely free from bolts and rivets. The electrically welded construction is especially advantageous for a saw belt of this nature for the reason that all of the members of which said belt is constructed are necessarily very thin. In making up the belt the cutting sections of adjacent links are on opposite sides of the belt, that is the relative position of the cutting member 31 and side section 32 alternate in each successive link. Each cutting member 31 is preferably provided at the front end with a rounded projection 36 and is provided directly in rear of the projection 36 with two or more sharp cutting points 37, the purpose of the rounded projection 36 being to engage with or ride on the bottom of a saw cut or groove to prevent tilting of the link as the saw is drawn through the work.

As the flexible saw blade passes around the spur wheel 39 the prongs on said wheel project between the cutting sections 31 and side sections 32 as shown by dotted lines in Fig. 1, and engage with the ends of the links 33 in such a manner as to drive the flexible saw blade. The links 33 of the saw blade being of less depth than the cutting sections 31 and side sections 32 leave a groove 37 on the inner edge of the flexible saw blade that is adapted to fit over and run upon the relatively thin track member 15 whereby said saw blade will be supported by said saw member.

The lower edge 37 of the track member 15 is preferably curved as shown in Figs. 1 and 2 to cause the flexible saw blade to more efficiently engage the work. The flexible saw blade is further guided at both ends of the frame by the guide members 16—16 and 20—20 respectively and said flexible saw member at the end of the frame adjacent the handle 18 passes freely over the idler disc 28. The discs 26 guide the links of the flexible saw member at the driving end of the saw and prevent them from tilting sidewise when a driving force is applied thereto. Slackness in the saw blade may be removed by means of the take up 23.

In the operation of the saw the person using the same holds the saw by means of handle 18 and motor 25. With the motor running and the saw blade moving at a desired rate of speed the saw is pressed against the material that is to be cut and will saw said material in an obvious manner by drawing the cutting sections through the material.

The saw is particularly adapted for cut off work as in sawing off small logs or piling or heavy timbers, but it will be understood that said saw may be used for any other purpose for which it is adapted and that said saw may be made in various shapes or sizes to suit the requirements of different kinds of work.

The foregoing description and accompanying drawings clearly disclose a preferred embodiment of my invention but it will be understood that this disclosure is merely illustrative and that such changes in the invention may be resorted to as are within the scope and spirit of the following claims.

I claim:

1. A flexible saw blade of link construction embodying blade sections, each alternate section being formed of two parts arranged side by side in spaced relation, said alternate sections being connected by single blade parts, having their respective ends positioned between the two blade parts of the alternate sections, and combined pivot and spacing means disposed entirely between the blade parts of the alternate sections and secured to said blade parts, the single blade parts being pivotally connected with said pivot and spacing means.

2. A flexible saw blade of link construction embodying a plurality of cutting elements, each formed of two relatively thin spaced apart metal blade parts that are free from perforations, and links having their respective ends positioned between the blade parts of adjacent cutting elements, said links being pivotally connected with said blade parts of said cutting elements.

3. A flexible saw blade of link construction embodying cutting elements, each formed of two relatively thin spaced apart metal blade parts, links having perforated ends positioned between the two metal blade parts of adjacent cutting elements and pivot pins disposed entirely between said spaced apart blade parts and rigid therewith and extending through the perforations in the links, those portions of the blade parts opposite the ends of the pivot pins being of solid and imperforated construction.

4. A flexible saw blade of link construction, embodying a plurality of cutting elements, each formed of two relatively thin spaced apart members, link elements having perforated ends positioned between said members and metal discs disposed within the perforations of said link elements, and forming pivots therefor, said metal discs being welded to said thin spaced apart members.

5. A flexible saw blade of link construction, embodying a plurality of cutting elements each formed of two relatively thin spaced apart members having saw teeth on one edge and means on the front end of each toothed member forming a rounded non-cutting portion for slidably engaging with a surface in which a saw cut is being made to prevent tilting movement of the cutting elements.

6. In a chain saw, a combined link and blade part, saw teeth formed on one edge of said link and blade part and a rounded non-cutting projection formed on said blade part for slidably engaging with the bottom of a saw cut in advance of the saw teeth to limit the depth of cut of the teeth and prevent tilting of the blade part.

7. In a chain saw, a blade formed of a plurality of cutting elements, each element embodying a pair of relatively thin members arranged side by side in slightly spaced apart relation, one member of each pair having teeth on one edge and the other member being without teeth, the ends of adjacent cutting elements being positioned relatively close together and the cutting members of successive adjacent cutting elements being on alternate sides and relatively thin links having their ends disposed between the two members of each cutting element, the link members being without teeth and the edges of the link members being below the cutting edge of the saw blade.

The foregoing specification signed at Seattle, Washington, this 6th day of January, 1926.

ERNEST E. FERGUSON.